United States Patent [19]

Engelhardt et al.

[11] Patent Number: 5,492,995
[45] Date of Patent: Feb. 20, 1996

[54] POLYCONDENSATES CONTAINING PHOSPHINIC OR PHOSPHONIC ACID GROUPS AND SILOXANE GROUPS

[75] Inventors: Fritz Engelhardt, Frankfurt am Main; Karl-Heinz Keil, Hanau; Jürgen Kühlwein, Heusenstamm; Wilfried Schuler, Limburg; Willi Steckelberg, Hofheim/Ts.; Ralf Zerrer, Alzenau; Werner Antwerpen, Schwalbach/Ts. all of Germany

[73] Assignee: Hoechst Aktiengesellschaft, Germany

[21] Appl. No.: 383,833

[22] Filed: Feb. 6, 1995

[30]   Foreign Application Priority Data

Feb. 11, 1994 [DE]  Germany .................... 44 04 363.5

[51] Int. Cl.$^6$ ................................. C08G 77/395
[52] U.S. Cl. .................. 528/26; 528/25; 528/29; 528/30; 536/404; 536/405; 8/115.64; 8/DIG. 1
[58] Field of Search ................ 528/26, 25, 29, 528/30; 556/404, 405; 8/115.64, 115.62, DIG. 1

[56]    References Cited

U.S. PATENT DOCUMENTS

| 3,019,248 | 1/1962 | Fekete | 556/404 |
| 3,441,537 | 4/1969 | Lengnick | 556/405 |
| 4,351,735 | 9/1982 | Buddemeyer et al. | 252/1 |
| 4,900,857 | 2/1990 | Klett | 556/405 |
| 5,041,586 | 8/1991 | Beck et al. | 556/405 |
| 5,256,765 | 10/1993 | Leong | 528/398 |

FOREIGN PATENT DOCUMENTS 245370   7/1968   U.S.S.R. .

9414822  7/1994   WIPO .

*Primary Examiner*—David Buttner
*Assistant Examiner*—Margaret W. Glass

[57]    ABSTRACT

The present invention relates to polycondensates of the general formula I

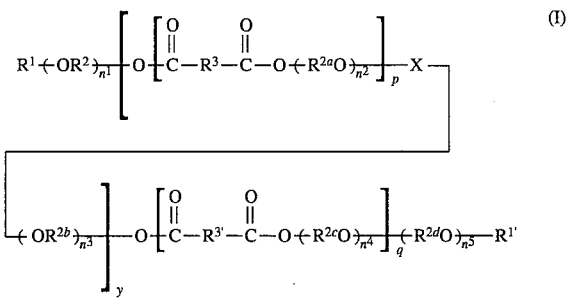

in which X stands, at least once, for a group of the formula VII

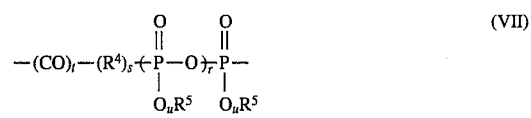

and, at least once, a group of the formula VIII

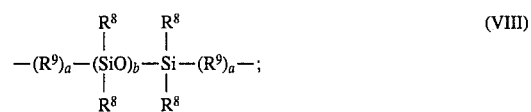

and the other variables are defined as indicated in claim 1, processes for their preparation and their use.

17 Claims, No Drawings

POLYCONDENSATES CONTAINING PHOSPHINIC OR PHOSPHONIC ACID GROUPS AND SILOXANE GROUPS

The present invention relates to polycondensates containing phosphinic or phosphonic acid groups and siloxane groups, processes for their preparation and their use.

It has been known for a long time that hydrophilic block copolymers can be employed both as soil release agents and as antistatics in the field of textile finishing.

Recently, certain polycondensation products have increasingly been employed as soil release components in detergent formulations. The hydrophilicity necessary for this purpose is achieved by 0 to 30 mol % of dicarboxylic acids or diol components carrying sulpho groups or salts thereof. Additionally, the hydrophilicity can be increased by use of long-chain poly(oxyalkylene)oxy units.

The chain length or the molecular weight of such products can be set by appropriate conduct of the reaction or alternatively by use of monofunctional components which function as chain caps (so-called "end caps"). Such "end caps" can be anionic or non-ionic and, for example, carboxylic acids or alcohols (see, for example, U.S. Pat. Nos. 4,721,580, 4,702,857, 4,711,730 and 4,713,194).

The present invention relates to polycondensates of the general formula I $$R^1 \mathrm{+OR^2)_{n^1}} \left[ O \begin{matrix} O & O \\ \| & \| \\ C-R^3-C \end{matrix} -O \mathrm{+R^{2a}O)_{n^2}} \right]_p X \quad \text{(I)}$$

$$\mathrm{+OR^{2b})_{n^3}} \left[ O \begin{matrix} O & O \\ \| & \| \\ C-R^{3'}-C \end{matrix} -O \mathrm{+R^{2c}O)_{n^4}} \right]_q \mathrm{+R^{2d}O)_{n^5}} R^{1'}$$

in which

X stands, at least once, for a group of the formula VII $$-(CO)_t-(R^4)_s \mathrm{+P-O)_r} P- \quad \text{(VII)}$$
$$\quad | \quad\quad | $$
$$O_u R^5 \quad O_u R^5$$

and, at least once, for a group of the formula VIII $$-(R^9)_a-(SiO)_b-Si-(R^9)_a-; \quad \text{(VIII)}$$

$R^1$ and $R^{1'}$ independently of one another denote hydrogen, $(C_1–C_{22})$-alkyl, $(C_2–C_{22})$-alkenyl, $(C_3–C_8)$-cycloalkyl, $(C_6–C_{14})$-aryl, $(C_6–C_{14})$-aryl-$(C_1–C_8)$-alkyl, $MO_3S—R^6—$, $MO_3S—$, $MO_3S \mathrm{+R^{2e}O)_{n^6}} R^{2e}—$, $R^7$—(aryl with $(OR^{2f})_{n^7}$—$SO_3M$ and $C$=O) , $$R^{5'} \mathrm{+P-O)_r} P-(R^4)_{s'}-(CO)_{t'}— \quad \text{or}$$

$R^{8'}—Si—O \mathrm{+SiO)_w} \mathrm{+SiO)_v}—Si— \quad ;$
(with $R^{8'}$, $R^{8'}$, $(R^{2g}O)_{n^8}R^{8''}$, $(R^{2g}O)_{n^8}R^{8''}$ substituents)

$R^2$ to $R^{2g}$ independently of one another denote $(C_1–C_{30})$-alkylene, $(C_3–C_8)$-cycloalkylene and/or $(C_2–C_{30})$-alkenylene, each of which can be substituted by a radical $R^1$;

$R^3$ and $R^{3'}$ independently of one another denote $(C_1–C_{22})$-alkylene, $(C_3–C_8)$-cycloalkylene; $(C_2–C_{22})$-alkenylene and/or $(C_6–C_{14})$-arylene, where 0 to 30% of all the radicals $R^3$ and $R^{3'}$ carry an —$SO_3M$ substituent;

$R^4$ denotes $(C_1–C_{30})$-alkylene, $(C_3–C_8)$-cycloalkylene or $(C_2–C_{30})$-alkenylene;

$R^5$, $R^{5'}$ and $R^{5''}$ independently of one another denote hydrogen, $(C_1–C_{30})$-alkyl, $(C_3–C_8)$-cycloalkyl or $(C_2–C_{30})$-alkenyl;

$R^6$ is defined as $R^3$, but independently of this;

$R^7$ denotes $(C_1–C_{22})$-alkyl, $(C_3–C_8)$-cycloalkyl or $(C_2–C_{22})$-alkenyl, where 0 to 30% of all the radicals $R^7$ carry an —$SO_3M$ substituent;

$R^8$, $R^{8'}$ and $R^{8''}$ independently of one another denote hydrogen, $(C_1–C_{30})$-alkyl, $(C_3–C_8)$-cycloalkyl or $(C_2–C_{30})$-alkenyl;

$R^9$ denotes $(C_1–C_{30})$-alkylene, $(C_3–C_8)$-cycloalkylene or $(C_2–C_{30})$-alkenylene;

M is hydrogen, an alkali metal, the ammonium group or a substituted ammonium group;

$n^1$ to $n^8$ independently of one another denote an integer from 0 to 40;

p and q independently of one another denote an integer from 2 to 20;

r and r' independently of one another denote an integer from 0 to 40;

t, t', s, s' and u independently of one another denote 0 or 1;

y denotes an integer from 2 to 20;

a denotes 0 or 1;

b denotes an integer from 0 to 80;

w denotes an integer from 0 to 80; and v denotes an integer from 0 to 80.

Alkyl groups can be straight-chain or branched and are, for example, methyl, ethyl, n-propyl, i-propyl, n-butyl, i-butyl, sec-buryl, tert-butyl, n-pentyl, 3-methylburyl, 3-pentyl, n-hexyl, 2-ethylbutyl, n-heptyl, i-heptyl, 2-octyl, 2-ethylhexyl, i-nonyl, n-decyl, i-decyl, n-dodecyl, n-hexadecyl or n-octadecyl. $(C_1–C_5)$-alkyl is preferred and $(C_1–C_3)$-alkyl is particularly preferred.

Alkylene groups can likewise be straight-chain or branched. Examples are ethylene, n-propylene, i-propylene, n-butylene, i-butylene, sec-butyl, tert-butylene, n-pentylene, 3-methylbutylene, n-hexylene, 2-ethylbutylene, n-heptylene, i-heptylene, octylene, 2-ethylhexylene, i-nonylene, n-decylene, i-decylene, n-dodecylene, n-hexadecylene and n-octadecylene.

$R^2$ to $R^{2f}$ alkylene groups preferably have 2 to 5 carbon atoms and particularly preferably denote ethylene, n-propylene or i-propylene.

$R^3$, $R^{3'}$ and $R^{4'}$ alkylene groups preferably have 1 to 5 carbon atoms.

Cycloalkyl radicals are in particular cyclopropyl, cyclobutyl, cyclopentyl, cyclohexyl, cycloheptyl and cyclooctyl, cyclopentyl and cyclohexyl being preferred. Cycloalkyl, however, is also understood as meaning, for example, dimethylcycloalkyl. The same applies to cycloalkylene groups.

Alkenyl groups can also be straight-chain or branched and correspond, for example, to the abovementioned alkyl groups. Preferred alkenyl groups have 2 to 5 carbon atoms, vinyl and allyl being particularly preferred.

Alkenylene groups can likewise be straight-chain or branched and correspond, for example, to the abovementioned alkylene groups. Preferred alkenylene groups have 2 to 5 carbon atoms, vinylene and propenylene being particularly preferred.

Aryl groups are preferably phenyl, naphthyl, biphenylyl or fluorenyl, phenyl being particularly preferred.

The same applies to arylene groups, 1,2-phenylene, 1,3-phenylene and 1,4-phenylene being particularly preferred.

Preferred arylalkyl groups are benzyl and phenethyl.

An alkali metal M is preferably sodium or potassium. As for substituted ammonium groups M, all customary mono-, di-, tri- or tetra-substituted ammonium groups can be employed. Suitable substituents are in this case in particular alkyl groups and optionally substituted phenyl. Tetra-($C_1$–$C_4$)-alkylammonium is preferred.

$R^6$ preferably denotes ($C_1$–$C_4$)-alkylene or ($C_2$–$C_4$)-alkenylene.

$R^7$ preferably denotes ($C_1$–$C_4$)-alkyl.

Any of the individual radicals $R^2$ to $R^{2g}$, provided n>1, can also have various meanings within a polycondensate according to the invention. Within a polymeric partial structure, e.g. —($R^{2a}O)_{n2}$—, these various meanings can follow one another in a random sequence or blockwise. The same applies to $R^3$ and $R^{3'}$ and also to $n^2$, $n^3$ and $n^4$.

In preferred polycondensates of the general formula I $R^1$ and $R^{1'}$ independently of one another denote methyl or ethyl, $R^2$ to $R^{2g}$ independently of one another denote ethylene, n-propylene or i-propylene, $R^3$ and $R^{3'}$ independently of one another denote ($C_1$–$C_4$)-alkylene, phenylene or naphthylene, $R^4$ denotes ($C_2$–$C_4$)-alkylene, $R^5$, $R^{5'}$ and $R^{5''}$ independently of one another denote hydrogen or ($C_1$–$C_5$)-alkyl, $R^8$, $R^{8'}$ and $R^{8''}$ independently of one another denote hydrogen or ($C_1$–$C_5$)-alkyl, $R^9$ denotes ($C_2$–$C_4$)-alkylene, M denotes hydrogen, sodium or potassium, $n^1$ to $n^8$ independently of one another denote an integer from 2 to 35, p and q independently of one another denote an integer from 2 to 20, r and r' independently of one another denote an integer from 0 to 19, y denotes an integer from 2 to 5, b denotes an integer from 0 to 40, w denotes an integer from 1 to 30, v denotes an integer from 0 to 4.

Preferred polycondensates of the general formula I are moreover those which have molecular weights from 2000 to 20,000.

In particularly preferred polycondensates of the general formula I, all the values $n^1$ to $n^8$ are identical or stand only for 2 or 3 different integers.

Moreover, it is particularly preferred if all the radicals $R^2$ to $R^{2g}$ are identical or only 2 or 3 have different meanings.

Furthermore, the sum p+q particularly preferably denotes an integer from 5 to 15.

The polycondensates of the general formula I according to the invention can be prepared by reacting with one another a) a compound of the general formula IIa

in which $R^3$ is defined as indicated above and $R^{10}$ denotes hydrogen, ($C_1$–$C_4$)-alkyl, halogen, in particular chlorine, or $R^{10}OOC$—$R^3$—CO—, and a compound of the general formula IIb

in which $R^{3'}$ is defined as indicated above and $R^{11}$ denotes hydrogen, ($C_1$–$C_4$)-alkyl, halogen, in particular chlorine, or $R^{11}OOC$—$R^{3'}$—CO— and b) a compound of the general formula IIIa

and/or a compound of the general formula IIIb

and/or a compound of the general formula IIIc

and/or a compound of the general formula IIId

and/or a compound of the general formula IIIe

in which $R^2$ to $R^{2d}$ and $n^1$ to $n^5$ are defined as indicated above, and c) a compound of the general formula IVa

in which $R^1$ is defined as indicated above, and a compound of the general formula IVb

in which $R^{1'}$ is defined as indicated above, and d) a compound of the general formula V

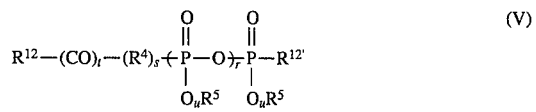

in which $R^4$, $R^5$, r, s, t and u are defined as indicated above, and $R^{12}$ and $R^{12'}$ independently of one another denote hydroxyl, ($C_1$–$C_4$)-alkoxy or halogen, in particular chlorine, and a compound of the general formula VI

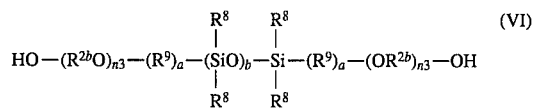

in which $R^{2b}$, $R^8$, $R^9$, $n^3$, a and b are defined as indicated above.

Compounds of the general formula IIa and IIb are, for example, malonic acid, succinic acid, glutaric acid, adipic acid, suberic acid, maleic acid, fumaric acid, itaconic acid, cyclohexane- 1,4-dicarboxylic acid, cyclohexane-1,3-dicarboxylic acid, phthalic acid, isophthalic acid, terephthalic acid, 1,4- and 1,5-naphthalenedicarboxylic acid, diphenic acid, norbornanedicarboxylic acid and also their methyl, ethyl, propyl and butyl esters, anhydrides and chlorides. In addition sodium, potassium and ammonium sulphonatosuccinic acid, sodium and potassium 4-sulphonatophthalic acid, sodium 2-sulphonatoterephthalic acid, sodium 5-sulphonatoisophthalic acid, sodium sulphonatosuccinic acid and also their methyl, ethyl, propyl and butyl esters, anhydrides and chlorides.

Compounds of the general formulae IIIa to IIIe are, for example, ethylene glycol, propane-1,2- and -1,3-diol, ethylene glycol mono(3-hydroxypropyl) ether, ethylene glycol mono( 3-hydroxy-2-propyl) ether, ethylene glycol mono(2-hydroxypropyl) ether, butanediols, in particular butane-1,4-diol, pentanediols, such as pentane-1,5-diol, hexanediols, in particular hexane-1,6-diol, decane-1,10-diol, diethylene glycol, dipropylene glycol, bis(3-hydroxypropyl) ether, triethylene glycol, tetraethylene glycol, tripropylene glycol, 4,8-dioxadecane-1,10-diol, polyethylene glycols of molecular weight 300 to 2000, polypropylene glycols of molecular weight 300 to 2000, polyethers of propane-1,3-diol and mixed polyethers of ethylene glycol with propylene glycol and/or optionally propane-1,3-diol, the polyethers mentioned having molecular weights from 300 to 2000, bis(4-hydroxybutyl) ether, 2-methylenepropane-1,3-diol, 2,4-dimethyl- 2-ethylhexane-1,3-diol, 2-ethyl -2-butylpropane-1,3-diol, 2,2-dimethylpropane-1,3-diol, 2-ethyl-2-isobutylpropane-1,3-diol, 2,2,4-trimethylhexane-1,6-diol, 1,3-dihydroxycyclohexane and 1,4-dihydroxycyclohexane (quinitol).

Compounds of the general formulae IVa and IVb are, for example, methanol, ethanol, n-propanol, i-propanol, n-butanol, cyclohexanol, cyclopentanol, benzyl alcohol, phenol, allyl alcohol, sulphonic acid, benzoic acids of the formula IX

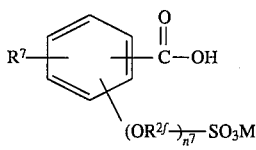

(IX)

in which $R^{2f}$, $R^7$, M and $n^7$ are defined as indicated above, compounds of the formula

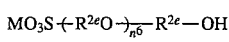

in which $R^{2e}$, M and $n^6$ are defined as indicated above, and (poly)phosphonic acids of the formula VII

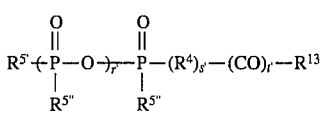

(VII)

in which $R^4$, $R^{5'}$, $R^{5''}$ and also r', s' and t' are defined as indicated above and R13 denotes hydroxyl $(C_1–C_4)$-alkoxy or halogen, in particular chlorine, as well as polysiloxanes of the formula X

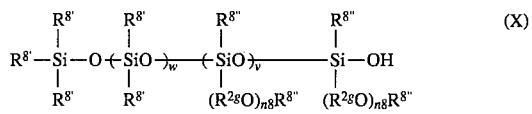

(X)

in which $R^{8'}$, $R^{8''}$, $R^{2g}$, $n^8$, v and w are defined as indicated above.

The benzoic acids of the formula VI can also be employed in the form of their $(C_1–C_4)$-alkyl esters or their halides, in particular chlorides.

In a preferred embodiment of the preparation process according to the invention, a) the compounds of the formulae IIa and IIb are employed in amounts of altogether 100 mol %, b) the compounds of the formulae IIIa to IIIe are employed in amounts of altogether 150 to 250 mol %, c) the compounds of the formulae IVa and IVb are employed in amounts of altogether 20 to 40 mol % and d) the compounds of the formulae V and VI are employed in amounts of altogether 10 to 50 mol %.

The reaction can be controlled by means of a specific conduct of the reaction and thus structure and molecular weights of the products prepared can be affected. Suitable parameters are temperature, pressure or alternatively amount and sequence of the addition of the starting compounds as in a) to d).

Customarily, the reaction is subdivided into an esterification reaction (if $R^{10}$ and $R^{11}$ denote hydrogen) or transesterification reaction (if $R^{10}$ and $R^{11}$ have a meaning other than hydrogen) and a condensation reaction. The (trans)esterification reaction is in this case normally carried out at normal pressure and the condensation reaction is carried out at a pressure of 1013 to 5 mbar. It is preferred to carry out the (trans)esterification reaction in the presence of an esterification or transesterification catalyst. Suitable catalysts of this type are, for example, titanium alkoxides, in particular titanium tetraisopropoxide, or manganese acetate and zinc acetate.

The process according to the invention is normally carried out at temperatures from 100° to 300° C., particularly preferably at 150° to 250° C. The reaction times are in this case 1 to 10 hours, preferably 2 to 5 hours.

If volatile products are formed during the reaction, these are distilled off after or preferably continuously during the reaction.

The compounds of the formulae IIa, IIb, IIIa to IIIe, IVa, IVb, V, VI, VII, X and IX are known, can be purchased or are available according to known preparation processes.

The polycondensates according to the invention can be dissolved or dispersed in water, clear to opalescent, viscous solutions resulting. On account of their soil release effects, they can be used for the textile finishing of polyester materials.

Polyester materials are in this case in particular to be understood as meaning threads, yarns or textile fabrics composed of polyester.

They are treated with the polycondensates according to the invention, for example, by applying the latter in a manner known per se, preferably in the form of dispersions, and after the customary drying, fixing by a heat treatment. Application is carried out, for example, by the exhaust process, by means of pad application or by spraying.

The polycondensates according to the invention are preferably applied here in amounts from 0.3 to 1.5% by weight, particularly preferably 0.6 to 1.2% by weight, relative to the substrate weight.

Accordingly, dispersions of the polycondensates according to the invention are applied which as a rule have a polycondensate content of from 5 to 45% by weight, preferably 10 to 35% by weight, preferably in an amount from 0.9 to 30% by weight, particularly preferably 2.4 to 12% by weight, relative to the substrate weight.

Mechanically applied dirt, such as oils and fats, can be removed significantly more easily from materials which have been treated with the polycondensates according to the invention (soil release effect).

A further advantage in comparison to the products of the prior art results due to a distinct decrease in the melt viscosity of the polycondensates according to the invention at 200° to 250° C. with an increasing proportion of phosphinic or phosphonic acid units in the molecule, which means a simplification of the preparation process. Moreover, as a result of the incorporation of the polysiloxane units, particularly advantageous handle properties are imparted to the textiles finished using the polycondensates according to the invention.

EXAMPLES

The following Table I names compounds of the general formula V which can be used in the following examples.

TABLE 1

$$R^{12}-(CO)_t-(R^4)_s+P(=O)(O_uR^5)-O\!\!\rightarrow_{\!r}\!\!P(=O)(O_uR^5)-R^{12'}$$

| No. | $R^4$ | $R^5$ | $R^{12}$ | $R^{12'}$ | s | t | u | r |
|---|---|---|---|---|---|---|---|---|
| P1 | $(CH_2)_2$ | $CH_3$ | OH | OH | 1 | 1 | 0 | 0 |
| P2 | $(CH_2)_3$ | $CH_3$ | OH | $OCH_3$ | 1 | 1 | 0 | 0 |
| P3 | $(CH_2)_4$ | $CH_3$ | OH | $OCH_3$ | 1 | 1 | 0 | 0 |
| P4 | $(CH_2)_2$ | $CH_3$ | $OCH_3$ | OH | 1 | 1 | 0 | 0 |
| P5 | $(CH_2)_3$ | $CH_3$ | $OCH_3$ | OH | 1 | 1 | 0 | 0 |
| P6 | $(CH_2)_4$ | $CH_3$ | $OCH_3$ | OH | 1 | 1 | 0 | 0 |
| P7 | $(CH_2)_2$ | $CH_3$ | $OC_2H_5$ | $OC_2H_5$ | 1 | 1 | 0 | 0 |
| P8 | $(CH_2)_3$ | $CH_3$ | $OC_2H_5$ | $OC_2H_5$ | 1 | 1 | 0 | 0 |
| P9 | $(CH_2)_2$ | $CH_3$ | OH | OH | 1 | 0 | 0 | 0 |
| P10 | — | $CH_3$ | OH | OH | 0 | 0 | 0 | 0 |
| P11 | — | $CH_3$ | $OCH_3$ | OH | 0 | 0 | 0 | 0 |
| P12 | — | $CH_3$ | $OC_2H_5$ | $OCH_3$ | 0 | 0 | 0 | 0 |
| P13 | — | $C_3H_7$ | OH | OH | 0 | 0 | 0 | 20 |
| P14 | — | $C_3H_7$ | $OCH_3$ | $OCH_3$ | 0 | 0 | 0 | 20 |

The following Table 2 names compounds of the general formula VII which can be used in the following examples:

TABLE 2

$$R^{5'}+P(=O)(R^{5''})-O\!\!\rightarrow_{\!r'}\!\!P(=O)(R^{5'''})-(R^4)_{s'}-(CO)_{t'}-R^{13} \quad (VII)$$

| No. | $R^4$ | $R^{5'}$ | $R^{5''}$ | $R^{13}$ | r' | s' | t' |
|---|---|---|---|---|---|---|---|
| P15 | — | $CH_3$ | $CH_3$ | $OCH_3$ | 0 | 0 | 0 |
| P16 | — | $C_2H_5$ | $C_2H_5$ | $OC_2H_5$ | 0 | 0 | 0 |
| P17 | $(CH_2)_2$ | $CH_3$ | $CH_3$ | $OCH_3$ | 0 | 1 | 1 |
| P18 | — | $CH_3$ | $CH_3$ | OH | 0 | 0 | 0 |
| P19 | — | $C_2H_5$ | $CH_3$ | OH | 0 | 0 | 0 |
| P20 | $(CH_2)_2$ | $CH_3$ | $CH_3$ | OH | 0 | 1 | 1 |
| P21 | — | $CH_3$ | $CH_3$ | OH | 20 | 0 | 0 |

The following Table 3 names compounds of the formula VI which can be employed in the following examples:

TABLE 3

$$HO-(R^{2b}O)_{n3}-(R^9)_a-(SiO)_b-Si(R^8)_2-(R^9)_a-(OR^{2b})_{n3}-OH$$

| No. | $R^9$ | $R^8$ | $R^{2b}$ | a | b | $n^3$ |
|---|---|---|---|---|---|---|
| Si1 | $(CH_2)_2$ | $CH_3$ | — | 1 | 10 | 0 |
| Si2 | $(CH_2)_3$ | $CH_3$ | — | 1 | 10 | 0 |
| Si3 | $(CH_2)_4$ | $CH_3$ | — | 1 | 10 | 0 |
| Si4 | $(CH_2)_2$ | $CH_3$ | $(CH_2)_2$ | 1 | 10 | 6 |
| Si5 | $(CH_2)_3$ | $CH_3$ | $(CH_2)_2$ | 1 | 10 | 6 |
| si6 | $(CH_2)_4$ | $CH_3$ | $(CH_2)_2$ | 1 | 10 | 6 |
| Si7 | $(CH_2)_2$ | $CH_3$ | $(CH_2)_3$ | 1 | 10 | 10 |
| si8 | $(CH_2)_3$ | $CH_3$ | $(CH_2)_3$ | 1 | 10 | 10 |
| si9 | $(CH_2)_4$ | $CH_3$ | $(CH_2)_3$ | 1 | 10 | 10 |
| si10 | $(CH_2)_2$ | $CH_3$ | $(CH_2)_4$ | 1 | 15 | 10 |
| Si11 | $(CH_2)_3$ | $CH_3$ | $(CH_2)_4$ | 1 | 15 | 10 |
| Si12 | $(CH_2)_4$ | $CH_3$ | $(CH_2)_4$ | 1 | 15 | 10 |
| Si13 | $-CH=CH-$ | $CH_3$ | — | 1 | 10 | — |
| Si14 | $-CH=CH-$ | $CH_3$ | — | 1 | 15 | — |

Example 1

282.47 g (1.70) mol of isophthalic acid, 80.45 g (0.30 mol) of sodium 5-sulphoisophthalic acid, 213.0 g (2.80 mol) of propane-1,2-diol, 127.40 g (1.20 mol) of diethylene glycol and 0.82 g (0.010 mol) of anhydrous sodium acetate are introduced into a 1—1 four-necked flask having a KPG stirrer, 40 cm injection column, internal thermometer and dropping funnel having an attached gas inlet tube. After this, the atmosphere is rendered inert with nitrogen and 0.19 g (0.0007 mol) of titanium tetraisopropoxide is then added. The mixture is then heated to an internal temperature of 180°–185° C., water being removed by distillation in the course of approximately 3 h. (70 g, 97% of theory). After cooling to 80°–85° C., 150.00 g (0.10 mol) of Si4 (see Table 3) and 15.20 g (0.10 mol) of the carboxyphosphinic acid P2 (see Table 1) are added in the form of 19.6 g (0.10 mol) of its ethylene glycol monoester. The temperature is then raised to 200°–210° C. After reaching this temperature, the pressure is lowered to 1 mbar in the course of 30 min. Further condensation is carried out for 3 h under these reaction conditions, a distillate amount of 220.00 g being produced.

After completion of the condensation, the flask is first cooled to about 150° C. and then pressurized with inert gas.

After cooling to room temperature, the solidified melt is broken into small pieces and removed.

Example 2

349.52 g (1.80 mol) of dimethyl terephthalate, 260.7 g (4.20 mol) of ethane-1,2-diol and 0.82 g (0.01 mol) of anhydrous sodium acetate are introduced into a 1—1 four-necked flask having a KPG stirrer, 40 cm injection column, internal thermometer and dropping funnel having an attached gas inlet tube. After this, the atmosphere is rendered inert with nitrogen and 0.19 g (0.0007 mol) of titanium tetraisopropoxide are then added. The flask is then heated to an internal temperature of 170°–175° C., methanol being removed by distillation in the course of approximately 2 h (120 g, i.e. 94% of theory). After cooling to 80°–85° C., 324.00 g (0.24 mol) of MPEG 1350, 300 g (0.20 mol) of PEG 1500 and 24.80 g (0.20 mol) of the dimethyl methylphosphonate ester P11 (see Table 1) and 361.80 g (0.20 mol) of Si2 (see Table 3) are added. The temperature is then raised to 200°–210° C. The mixture is further condensed under these reaction conditions for 3 h, a distillate amount of 210.00 g being produced.

After completion of the condensation, the flask is first cooled to about 150° C. and then pressurized with inert gas.

After cooling to room temperature, the solidified melt is broken into small pieces and removed.

Example 3

282.47 g (1.70 mol) of isophthalic acid, 80.45 g (0.30 mol) of sodium 5-sulphoisophthalic acid, 217.2 g (3.50 mol) of ethane-1,2-diol, 76.10 g (1.0 mol) of propane-1,2-diol, 29.63 g (0.20 mol) of sodium 2-hydroxyethanesulphonate and 0.82 g (0.10 mol) of anhydrous sodium acetate are introduced into a 1—1 four-necked flask having a KPG stirrer, 40 cm injection column, internal thermometer and dropping funnel having an attached gas inlet tube. After this, the atmosphere is rendered inert with nitrogen and 0.19 g (0.0007 mol) of titanium tetraisopropoxide is then added. The flask is then heated to an internal temperature of 170°–175° C., water being removed by distillation in the course of approximately 2 h (68.0 g, i.e. 94% of theory). After cooling to 80°–85° C., 42.40 g (0.02 mol) of propanephosphonic anhydride P13 (see Table 1) and 300.00 g (0.20 mol) of Si4 (see Table 3) are added. The internal temperature is then raised to 200°–210° C. After reaching this temperature, the pressure is lowered to 1 mbar in the course of 30 min and the temperature is raised to 220° C. The mixture is further condensed under these reaction conditions for 3 h, a distillate amount of 210.00 g being produced.

After completion of the condensation, the flask is first cooled to about 150° C. and then pressurized with inert gas.

After cooling to room temperature, the solidified melt is broken into small pieces and removed.

Polycondensates according to the invention can also be prepared using the following starting compounds analogously to Examples 1 to 3:

Example 4

0.3 mol of sodium dimethyl 5-sulphoisophthalate,
1.7 mol of dimethyl isophthalate,
2.5 mol of ethane-1,2-diol,
2.0 mol of propane-1,2-diol,
0.2 mol of compound P3 as in Table 1,
0.05 mol of compound Si1 as in Table 3.

Example 5

0.3 mol of sodium dimethyl 5-sulphoisophthalate,
1.7 mol of dimethyl terephthalate,
2.0 mol of ethane-1,2-diol,
2.5 mol of propane-1,3-diol,
0.1 mol of compound P9 as in Table 1,
0.02 mol of compound Si5 as in Table 3.

Example 6

2.0 mol of dimethyl terephthalate,
3.5 mol of propane-1,2-diol,
1.0 mol of polyethylene glycol 1500,
0.05 mol of compound P13 as in Table 1,
0.15 mol of compound Si6 as in Table 3,
0.1 mol of polyethylene glycol monomethyl ether 750.

Example 7

0.5 mol of dimethyl succinate,
1.5 mol of dimethyl isophthalate,
0.5 mol of 1,4-bis(hydroxymethyl)cyclohexane, cis/trans,
4.0 mol of ethane-1,2-diol,
0.3 mol of compound P1 as in Table 1,
0.10 mol of compound Si5 as in Table 3,
0.2 mol of 2-hydroxyethanesulphonic acid, Na salt.

Example 8

0.2 mol of 1,4-naphthalenedicarboxylic acid,
1.5 mol of sodium 5-sulphoisophthalic acid,
3.0 mol of diethylene glycol,
1.5 mol of hexane-1,6-diol,
0.2 mol of compound P2 as in Table 1,
0.01 mol of compound Si8 as in Table 3,
0.2 mol of 3-Na-sulphobenzoic acid.

Example 9

1.0 mol of dimethyl adipate,
1.0 mol of dimethyl terephthalate,
2.0 mol of diethylene glycol,
2.5 mol of polyethylene glycol 1000,
0.05 mol of compound P1 as in Table 1,
0.15 mol of compound Si1 as in Table 3,
0.05 mol of compound P18 as in Table 2.

We claim:
1. Polycondensates of the formula I

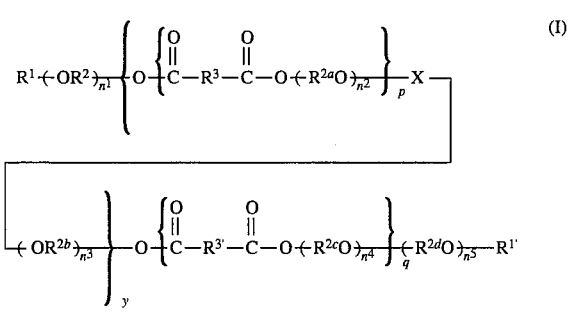

in which

X stands, at least once, for a group of the formula VII

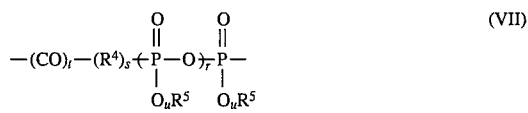

and, at least once, for a group of the formula VIII

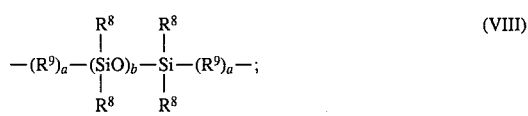

with the remainder of the X's being of formulas VII and VIII, $R^1$ and $R^{1'}$ independently of one another denote a hydrogen, a $(C_1-C_{22})$-alkyl, a $(C_2-C_{22})$-alkenyl, a $(C_3-C_8)$-cycloalkyl, a $(C_6-C_{14})$-aryl, a $(C_6-C_{14})$-aryl-$(C_1-C_8)$-alkyl-, a $MO_3S-R^6-$, a $MO_3S-$,

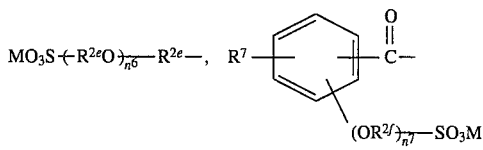

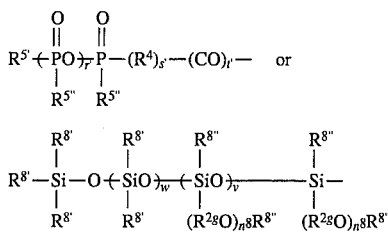

$R^2$ and $R^{2a}$ to $R^{2g}$ independently of one another denote a $(C_1-C_{30})$-alkylene, a $(C_3-C_8)$-cycloalkylene and/or a $(C_2-C_{30})$-alkenylene, each of which is optionally substituted by a radical $R^1$;

$R^3$ and $R^{3'}$ independently of one another denote a $(C_1-C_{22})$-alkylene, a $(C_3-C_8)$-cycloalkylene, a $(C_2-C_{22})$-alkenylene and/or a $(C_6-C_{14})$arylene, where 0 to 30% of all the radicals $R^3$ and $R^{3'}$ carry an $—SO_3M$ substituent;

$R^4$ denotes a $(C_1-C_{30})$-alkylene, a $(C_3-C_8)$-cycloalkylene or a $(C_2-C_{30})$-alkenylene;

$R^5$, $R^{5'}$ and $R^{5''}$ independently of one another denote hydrogen, a $(C_1-C_{30})$-alkyl, a $(C_3-C_8)$-cycloalkyl or a $(C_2-C_{30})$-alkenyl;

$R^6$ is defined as $R^3$, but is selected independently of $R^3$;

$R^7$ denotes a $(C_1-C_{22})$-alkyl, a $(C_3-C_8)$-cycloalkyl or a $(C_2-C_{22})$-alkenyl, where 0 to 30% of all the radicals $R^7$ carry an $—SO_3M$ substituent;

$R^8$, $R^{8'}$ and $R^{8''}$ independently of one another denote a hydrogen, a $(C_1-C_{30})$-alkyl, a $(C_3-C_8)$-cycloalkyl or a $(C_2-C_{30})$-alkenyl;

$R^9$ denotes a $(C_1-C_{30})$-alkylene, a $(C_3-C_8)$-cycloalkylene or a $(C_2-C_{30})$-alkenylene;

M is hydrogen, an alkali metal, an ammonium group, a mono-, di-, tri- or tetra-substituted ammonium with alkyl or phenyl;

$n^1$ to $n^8$ independently of one another denote an integer from 0 to 40;

p and q independently of one another denote an integer from 2 to 20;

r and r' independently of one another denote an integer from 0 to 40;

t, t', s, s' and u independently of one another denote 0 or 1;

y denotes an integer from 2 to 20;

a denotes 0 or 1;

b denotes an integer from 0 to 80;

w denotes an integer from 0 to 80; and v denotes an integer from 0 to 8.

2. Polycondensates according to claim 1, wherein $R^1$ and $R^{1'}$ independently of one another denote methyl or ethyl, $R^2$ and $R^{2a}$ to $R^{2g}$ independently of one another denote an ethylene, an n-propylene or an i-propylene, $R^3$ and $R^{3'}$ independently of one another denote a $(C_1-C_4)$-alkylene, a phenylene or a naphthylene, $R^4$ denotes a $(C_2-C_4)$-alkylene, $R^5$, $R^{5'}$ and $R^{5''}$ independently of one another denote a hydrogen or a $(C_1-C_5)$-alkyl, $R^8$, $R^{8'}$ and $R^{8''}$ independently of one another denote it hydrogen or a $(C_1-C_5)$-alkyl, $R^9$ denotes a $(C_2-C_4)$-alkylene, M denotes a hydrogen, a sodium or a potassium, $n^1$ to $n^8$ independently of one another denote an integer from 2 to 35, p and q independently of one another denote an integer from 2 to 20, r and r' independently of one another denote an integer from 0 to 19, y denotes an integer from 2 to 5, b denotes an integer from 0 to 40, w denotes an integer from 1 to 30, v denotes an integer from 0 to 4.

3. Polycondensates according to claim 1, wherein all the values $n^1$ to $n^8$ are identical or $n^1$ to $n^8$ are selected such that $n^1$ to $n^8$ only have 2 or 3 different values instead of the possible total of eight different meanings for the group of $n^1$ to $n^8$.

4. Polycondensates according to claim 1, wherein all the radicals $R^2$ to $R^{2g}$ are identical or $R^2$ and $R^{2a}$ to $R^g$ are selected such that $R^2$ and $R^{2a}$ to $R^{2g}$ only have 2 or 3 different meanings instead of the possible total of different meanings for the group of $R^2$ and $R^{2a}$ to $R^{2g}$.

5. Polycondensates according to claim 1, characterized in that the sum $p+q$ is an integer from 5 to 15.

6. Polycondensates according to claim 1, wherein said polycondensates have molecular weights of 2,000 to 20,000.

7. Polycondensates according to claim 2, wherein all the values $n^1$ to $n^8$ are identical or $n^1$ to $n^8$ are selected such that $n^1$ to $n^8$ only have 2 or 3 different values, all the radicals $R^2$ and $R^{2a}$ to $R^{2g}$ are identical or $R^2$ and $R^{2a}$ to $R^{2g}$ are selected such that $R^2$ and $R^{2a}$ to $R^{2g}$ only have 2 or 3 different meanings instead of the total possible different meanings, the sum $p+q$ is an integer from 5 to 15 and said polycondensates having molecular weights of 2,000 to 20,000.

8. Polycondensates according to claim 7, wherein r and r' independently of one another denote an integer from 1 to 19, b denotes an integer from 1 to 40, and v denotes an integer from 1 to 4.

9. A process for the preparation of the polycondensates of the formula I

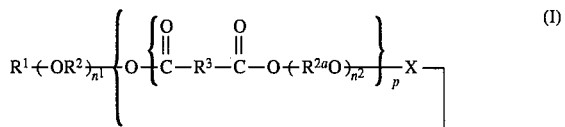

in which

X stands, at least once, for a group of the formula VII

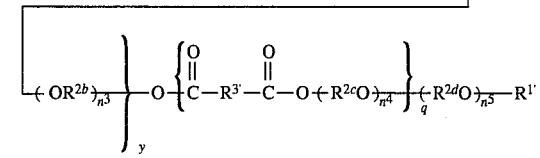

and, at least once, for a group of the formula VIII

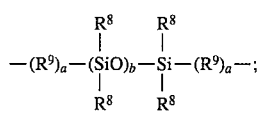
(VIII)

with the remainder of the X's being of formula VII and VIII $R^1$ and $R^{1'}$ independently of one another denote a hydrogen, a $(C_1-C_{22})$-alkyl, a $(C_2-C_{22})$-alkenyl, a $(C_3-C_8)$-cycloalkyl, a $(C_6-C_{14})$-aryl, a $(C_6-C_{14})$-aryl-$(C_1-C_8)$-alkyl-, $MO_3S$—$R^6$—, $MO_3S$—,

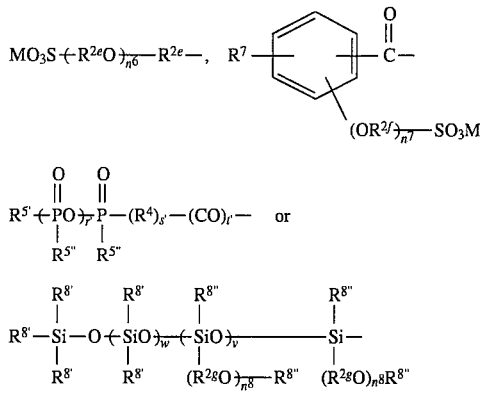

$R^2$ and $R^{2a}$ to $R^{2g}$ independently of one another denote a $(C_1-C_{30})$-alkylene, a $(C_3-C_8)$-cycloalkylene and/or a $(C_2-C_{30})$-alkenylene, each of which is optionally substituted by a radical $R^1$;

$R^3$ and $R^{3'}$ independently of one another denote a $(C_1-C_{22})$-alkylene, a $(C_3-C_8)$-cycloalkylene, a $(C_2-C_{22})$-alkenylene and/or a $(C_6-C_{14})$arylene, where 0 to 30% of all the radicals $R^3$ and $R^{3'}$ an —$SO_3M$ substituent;

$R^4$ denotes a $(C_1-C_{30})$-alkylene, a $(C_3-C_8)$-cycloalkylene or a $(C_2-C_{30})$-alkenylene;

$R^5$, $R^{5'}$ and $R^{5''}$ independently of one another denote a hydrogen, a $(C_1-C_{30})$-alkyl, a $(C_3-C_8)$-cycloalkyl or a $(C_2-C_{30})$-alkenyl;

$R^6$ is defined as $R^3$, but is selected independently of $R^3$;

$R^7$ denotes a $(C_1-C_{22})$-alkyl, a $(C_3-C_8)$-cycloalkyl or a $(C_2-C_{22})$-alkenyl, where 0 to 30% of all the radicals $R^7$ carry an —$SO_3M$ substituent;

$R^8$, $R^{8'}$ and $R^{8''}$ independently of one another denote hydrogen, a $(C_1-C_{30})$-alkyl, a $(C_3-C_8)$-cycloalkyl or a $(C_2-C_{30})$-alkenyl;

$R^9$ denotes a $(C_1-C_{30})$-alkylene, a $(C_3-C_8)$-cycloalkylene or a $(C_2-C_{30})$-alkenylene;

M is hydrogen, an alkali metal, an ammonium group, a mono-, di-, tri- or tetra-substituted ammonium group with alkyl or phenyl;

$n^1$ to $n^8$ independently of one another denote an integer from 0 to 40;

p and q independently of one another denote an integer from 2 to 20;

r and r' independently of one another denote an integer from 0 to 40;

t, t', s, s' and u independently of one another denote 0 or 1;

y denotes an integer from 2 to 20;

a denotes 0 or 1;

b denotes an integer from 0 to 80;

w denotes an integer from 0 to 80; and v denotes an integer from 0 to 8 comprising a reaction of a) a compound of the formula (IIa)

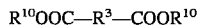 (IIa)

in which $R^3$ is defined as indicated above and $R^{10}$ denotes a hydrogen, a $(C_1-C_4)$-alkyl, halogen or $R^{10}OOC$—$R^3$—CO—, and a compound of the formula IIb

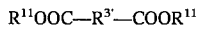 (IIb)

in which $R^{3'}$ is defined as indicated above and $R^{11}$ denotes a hydrogen, a $(C_1-C_4)$-alkyl, halogen, or $R^{11}OOC$—$R^{3'}$—CO— and b) a compound of the formula IIIa

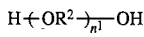 (IIIa)

and/or a compound of the formula IIIb

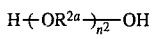 (IIIb)

and/or a compound of the formula IIIc

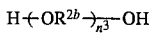 (IIIc)

and/or a compound of the formula IIId

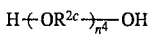 (IIId)

and/or a compound of the formula IIIe

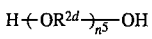 (IIIe)

in which $R^2$ and $R^a$ to $R^{2d}$ and $n^1$ to $n^5$ are defined as indicated above, and c) a compound of the formula IVa

 (IVa)

in which $R^1$ is defined as indicated above, and a compound of the formula IVb

 (IVb)

in which $R^{1'}$ is defined as indicated above, and d) a compound of the formula V

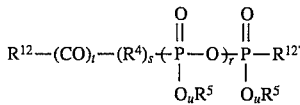 (V)

in which $R^4$, $R^5$, r, s, t and u are defined as indicated above, and $R^{12}$ and $R^{12'}$ independently of one another denote a hydroxyl, a $(C_1-C_4)$-alkoxy or halogen, and a compound of the formula VI

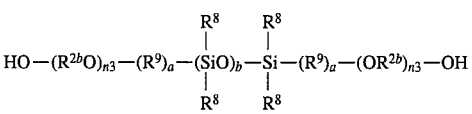 (VI)

in which $R^{2b}$, $R^8$, $R^9$, $n^3$, a and b are defined as indicated above.

10. Process according to claim 9, wherein a) the compounds of the formulae IIa and IIb are employed in amounts of altogether 100 mol %, b) the compounds of the formulae IIIa to IIIe are employed in amounts of altogether 150 to 250 mol %, c) the compounds of the formulae IVa to IVb are employed in amounts of altogether 20 to 40 mol % and d) the compounds of the formulae V and VI are employed in mounts of altogether 10 to 50 mol % wherein b), c) and d) are based upon 100 mol % a).

11. The process according to claim 9, wherein $R^{12}$ and $R^{12'}$ are chlorine.

12. The process according to claim 10, wherein $R^{12}$ and $R^{12'}$ are chlorine.

13. The process according to claim 9, wherein the reaction is carried out at a temperature range from about 100° to 300° C. for about 1 to about 10 hours.

14. The process according to claim 12, wherein the reaction is carried out at a temperature range from about 100° to 300° C. for about 1 to about 10 hours.

15. A process for textile finishing of polyester fabrics comprising dissolving or dispersing the polycondensates according to claim 1 into water from a solution and treating said polyester fabric with said solution.

16. The process as claimed in claim 13, wherein $R^{12}$ and $R^{12'}$ independently of one another, denote a hydroxyl, a $(C_1-C_4)$-alkoxy or a chlorine.

17. The process as claimed in claim 16, wherein $R^{12}$ and $R^{12'}$ represent chlorine.

* * * * *